United States Patent [19]

Solomon

[11] 4,043,775

[45] Aug. 23, 1977

[54] AIR LOCK FILTER SYSTEM

[75] Inventor: Richard L. Solomon, Selinsgrove, Pa.

[73] Assignee: Ecolaire Inc., Philadelphia, Pa.

[21] Appl. No.: 644,656

[22] Filed: Dec. 29, 1975

[51] Int. Cl.$^2$ .............................................. B01D 46/04
[52] U.S. Cl. ........................................ 55/302; 55/431;
55/504; 55/523; 302/57
[58] Field of Search ................... 55/429, 432, 301–303,
55/500, 504, 341, 431, 310–312; 210/333, 323;
214/17 R, 17 C, 17 D, 17 DA; 302/53, 54, 57

[56] References Cited

U.S. PATENT DOCUMENTS

| 1,925,413 | 9/1933 | Smith | 55/96 |
|---|---|---|---|
| 2,892,510 | 6/1959 | Wygant | 55/302 |
| 2,980,207 | 4/1961 | Allen | 55/523 |
| 3,431,709 | 3/1969 | Kawanami | 210/323 |
| 3,747,765 | 7/1973 | Nowak | 210/323 T |
| 3,832,832 | 9/1974 | Hoon Jr. | 55/302 |

FOREIGN PATENT DOCUMENTS

| 2,058,422 | 5/1971 | France | 55/302 |
|---|---|---|---|
| 1,395,983 | 5/1975 | United Kingdom | 55/302 |

Primary Examiner—Bernard Nozick
Attorney, Agent, or Firm—Seidel, Gonda & Goldhammer

[57] ABSTRACT

There is disclosed an air lock filter system for separating solids from gases at temperatures up to about 1200° F. wherein the filter element is a rigid porous refractory tube in an air vent for a pressure vessel. The filter element is located so that gas under pressure introduced into the vessel backwashes the filter element.

11 Claims, 2 Drawing Figures

AIR LOCK FILTER SYSTEM

BACKGROUND

An air lock device is used to gravity dry, free-flowing materials from one pressure zone to another. It is used, for example, to transmit material from an overhead collection point to a pressurized pneumatic conveying system pipeline without employing boiler flue gases as a conveying medium and without causing reentrainment of the material into the gas stream.

The air lock device includes a valve which isolates a bottom vessel from an upper vessel and a valve which isolates the bottom vessel from the conveying pipeline. Another valve on the upper vessel controls the introduction of materials thereinto. When materials are introduced into the upper vessel, the upper vesel must be vented to atmosphere so as to permit air to escape. Material is discharged from the upper vessel to the lower vessel by introducing a gas into the upper vessel at an elevation above any materials therein and at a pressure greater than the pressure of the conveying pipeline.

It is necessary to provide the air vent with a filter system to preclude the escape of high temperature dry, free-flowing materials. The problem is to prevent such discharge of materials to the surrounding atmosphere or into other parts of the system while at the same time having a filter element which requires little or no maintenance, can withstand the temperatures involved, and is readily accessible while at the same time will permit flow in opposite directions.

DISCLOSURE

The present invention is directed to an air lock filter system which includes a housing having a dirty gas inlet and a vent outlet. A valve means is operatively connected to the housing by way of the vent outlet for selectively venting the housing to atmosphere and for selectively connecting the housing to a source of gas under pressure. A filter element in the form of a rigid hollow tube of refractory material is supported in the housing and arranged so that the interior of the tube communicates at one end with one of said outlet and inlet. A means is provided for closing the other end of the tube. The periphery of said tube is exposed to gas entering the housing by way of said inlet which is adapted to be connected to a pressure vessel.

Any of the particulate which ordinarily would escape when the pressure vessel is vented to atmosphere will be trapped by the filter element. When the pressure vessel is being pressurized, the pressurized gas is introduced through said one end of said filter element to thereby simultaneously backwash the filter element. Hence, the air lock filter system of the present invention automatically attains a backwash when the pressurized gas is introduced into the pressure vessel to affect a discharge of material from the pressure vessel.

It is an object of the present invention to provide a novel air lock filter system.

It is another object of the present invention to provide an air lock filter system which utilizes a rigid porous refractory tube as a filter element for separating solids from gases at temperatures up to about 1200° F.

It is another object of the present invention to provide an air lock filter system which is orientated so that it will automatically be backwashed when air is introduced into a pressure vessel to effect discharge of contents from the pressure vessel.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIG. 1 a system in accordance with the present invention designated generally as 10.

Figure 1:
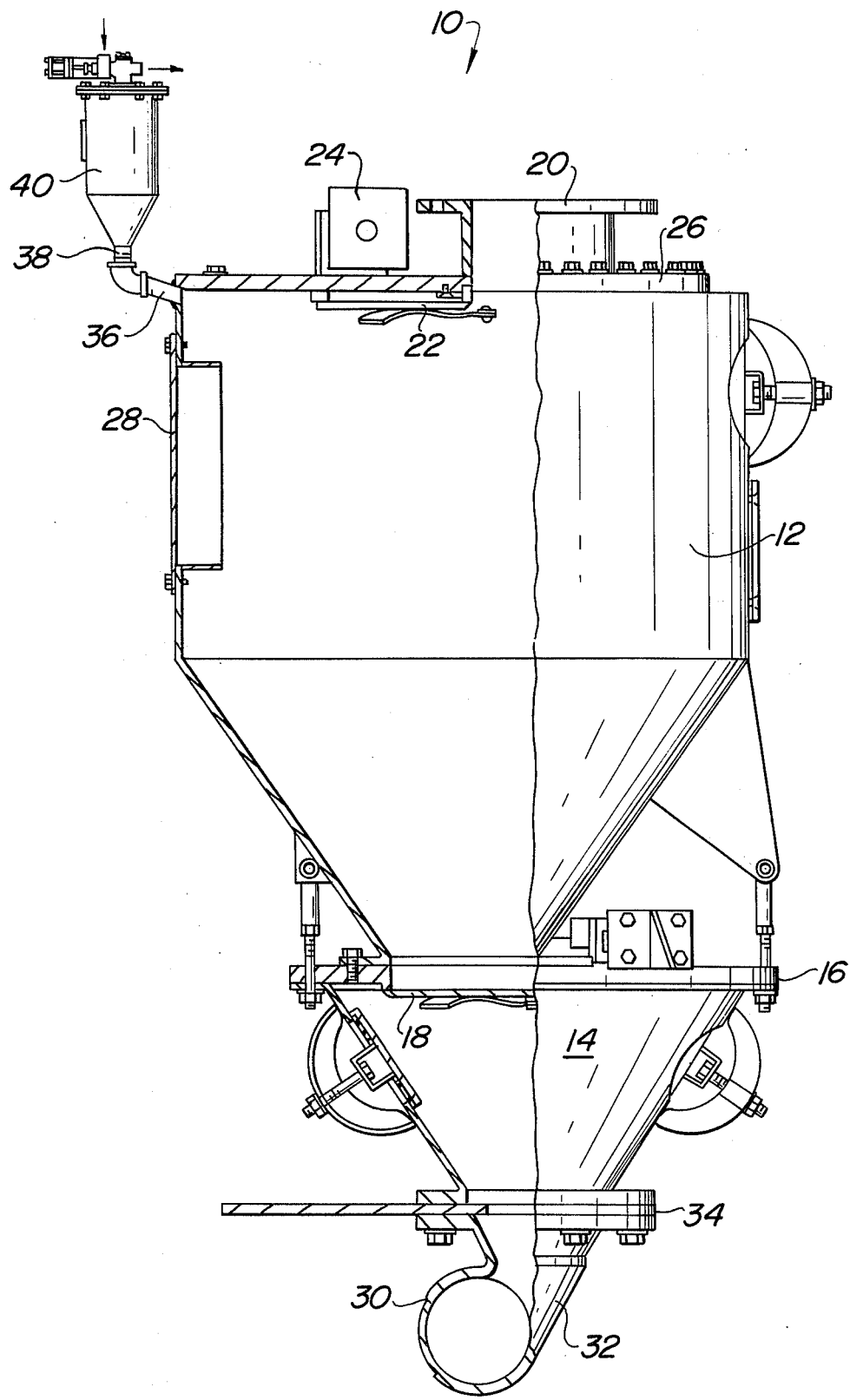
FIG. 1 is a vertical sectional view of a system in accordance with the present invention.

An upper vesel 12 is connected to a lower vessel 14 by way of a deck plate 16 containing an opening controlled by a selectively operable valve 18. The valve 18 is preferably a sliding gate valve.

The upper vessel 12 is preferably cone-shaped at its lower end and provided at its upper end with an inlet 20. The inlet 20 is controlled by a selectively operable valve member 22. Valve member 22 is preferably a sliding gate valve moved between operative and inoperative positions by an air cylinder 24 mounted on the top deck plate 26. Vessel 12 may be provided with an access panel 28 in a side wall thereof if desired.

The bottom vessel 14 is provided with a intake tee 32 which communicates with a conveying pipeline 30. The conveying pipeline 30 is at a pressure between 3 and 14 psi and may be utilized to convey a mixture of solids and liquids to a silo or other storage area. A selectively operable valve 34 is provided between the intake tee 32 and the lower end of the cone-shaped bottom of vessel 14. Valve 34 is preferably a metering and cut-off slide gate valve.

The upper end of the upper vessel 12 is vented to atmosphere by way an air lock filter connected to conduit 36. Conduit 36 is removably connected to inlet 38 on the lower end of a housing 40. The upper end of the housing 40 is provided with a cover 42 containing an outlet port 44. Flow through the outlet port 44 is controlled by a valve 46.

The valve 46 includes a threaded port 48 adapted to be vented directly to atmosphere and a threaded port 50 adapted to be connected to a source of gas under pressure. Each of the ports 48 and 50 selectively communicate with the valve chamber 52 which in turn is directly in communication with the outlet port 44.

Figure 2:
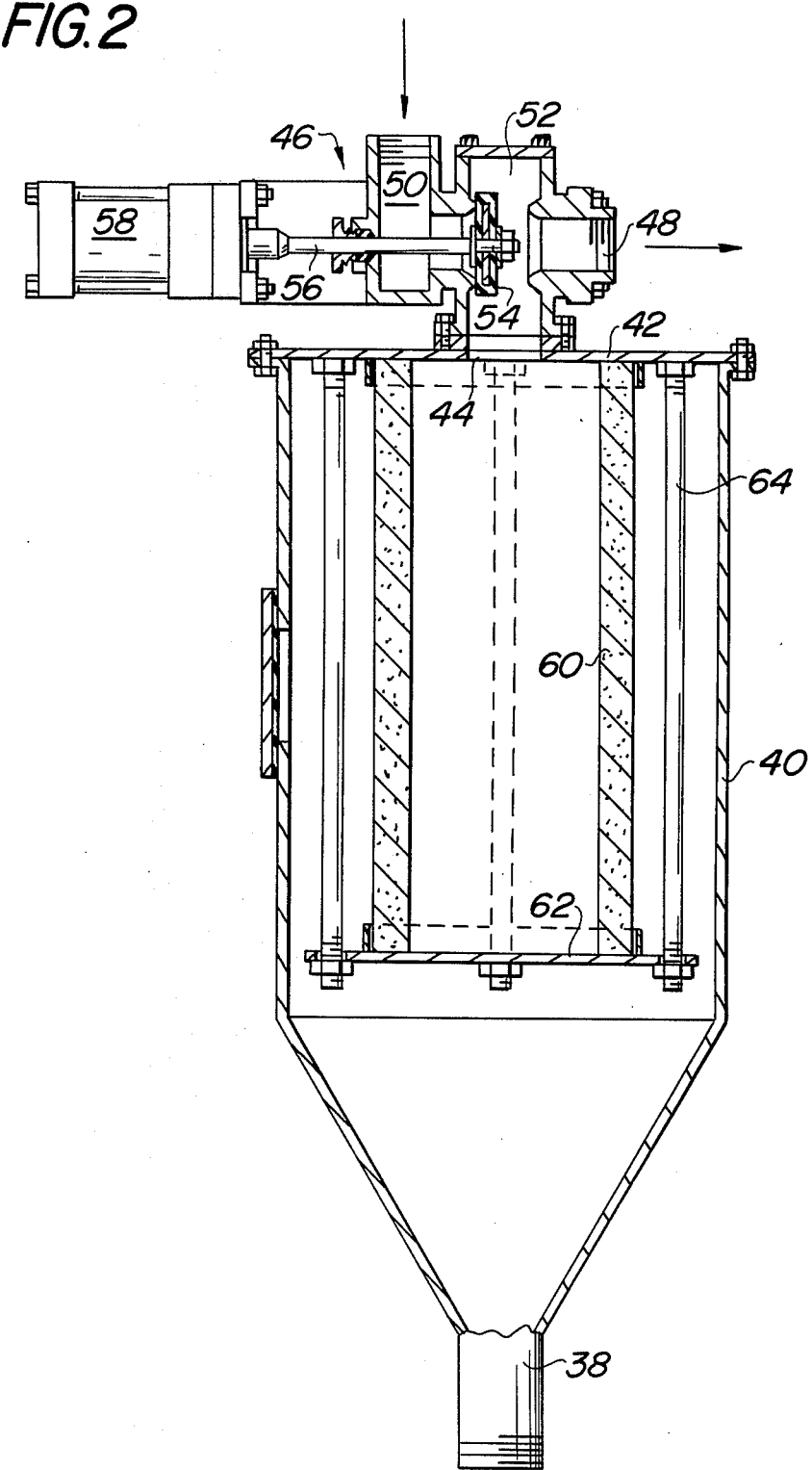
FIG. 2 is a vertical sectional view of the air lock filter on an enlarged scale.

Flow between port 50 and chamber 52, as illustrated in FIG. 2, is closed by a valve element 54. Element 54 is connected to a piston rod 56 which in turn is connected to a piston within cylinder 58. When the piston rod 56 and valve element 54 are moved from left to right in FIG. 2, port 50 communicates directly with chamber 52 while at the same time element 54 will interrupt the communication between chamber 52 and the port 48. Thus, valve member 54 selectively closes one of a pair of aligned openings so that only one of the ports 48, 50 communicates with chamber 52 at any given time.

As shown more clearly in FIG. 2, there is provided within the housing 40 a filter element 60. the filter element 60 is a rigid porous refractory tube having an axial length of about 18 inches. The length of the tube 60 may be varied as desired. Tube 60 preferably has an OD of 8 inches and an ID of 6 inches. These diameters may be varied as desired. A wide variety of materials maybe utilized for the tube 60.

The tube 60 in the preferred embodiment of the present invention is made from a porous refractory material sold commercially under the trademark ALUNDUM by the Refractory Division of the Norton Company, Worcester, Massachusetts. A typical chemical analysis of said ALUNDUM material is as follows:

$Al_2O_3$: 82%
$SiO_2$: 13
$Fe_2O_3$: 1.0
MgO: 0.5
CaO: 0.8
$Na_2O$: 0.2
$TiO_2$: 2.5
MnO: trace.

The upper end of the tube 60 circumscribes the outlet port 44 and is sealed to the lower surface of the cover 42 by a sealant. The lower end of the tube 60 is closed in any convenient manner such as by a bottom plate 62. A sealant is preferably provided between the plate 62 and the lower end face of the tube 60. Plate 62 is supported within the housing 40 by way of a plurality of adjustable tie rods 64 connected at their upper end to the cover 42 to thereby provide a means for supporting the tube 60 within the housing 40. If desired, a ring-like collar may be provided on the lower surface of cover 42 and the upper surface of plate 62 to act as a guide for the ends of the tube 60 to prevent the ends from shifting. The housing 40 may be provided with a sight panel to facilitate obseravation of the components disposed therewithin. All of the components of the system disclosed herein are made of high temperature resistant materials including the filter element which can withstand temperatures up to about 1200° F.

The system 10 operates as follows.

Valve 34 is normally open and is closed for maintenance purposes. Valve 18 is closed and valve 22 is open. Valve 46 is in the position shown in FIG. 2. Dry, free-flowing material such as fly ash at a temperature of 1000° F. is introduced by a gravity feed into the upper vessel 12 by way of inlet 20. Air within the upper vessel 12 which is displaced by the material is vented by way of port 48 to the atmosphere. Any of the material which tends to flow from the upper vessel 12 to the port 48 is filtered out as the air flows into the tube 60.

When the desired amount of material is provided within the upper chamber 12, valve 22 is closed, valve 18 is opened, and valve 46 is shifted so that valve element 54 closes off the port 48. This results in port 50 being in communication with the space above the material within the upper vessel 12 by way of housing 40 and conduit 36. Gas under pressure, which is preferably about 1 to 1½ pounds greater that the pressure in pipeline 30 is introduced from a source not shown into the space above the material in vessel 12 to push the material downwardly into the bottom vessel 14. The air or other gas under pressure introduced by way of port 50 acts as a backwash for the tube 60. Hence, each time a quantity of material is transferred from the upper vessel 12 to the lower vessel 14, the filter tube 60 is backwashed by the same air used to effect the transfer.

Thereafter, valve 18 is closed and valve 34 is opened whereby the material is introduced into the pipeline 30 for conveyance to any suitable storage location such as a silo. The transfer tee 32 acts as a surge chamber.

The present invention may be embodied in other specific forms without departing from the spirit or essential attributes thereof and, accordingly, reference should be made to the appended claims, rather than to the foregoing specification as indicating the scope of the invention.

I claim:

1. An air lock filter system comprising a pressure vessel having a materials inlet at an elevation above the elevation of a materials outlet from said pressure vessel, a housing supported adjacent the upper portion of said vessel and having a dirty gas inlet and a vent outlet, said dirty gas inlet communicating with the upper end of said vessel, a first valve means operatively connected to said housing by way of said vent outlet for selectively venting the housing and for connecting the housing to a source of gas under pressure, second valve means for controlling the inlet and outlet of said pressure vessel, a hollow filter tube in said housing arranged so that the interior of said tube communicates at one end with said vent outlet and thereby with said first valve means, means closing the other end of said tube, said tube being a rigid porous refractory, and means supporting said tube in said housing to prevent gas passing through said housing from by-passing said filter tube so that the outer periphery of said tube is exposed to gas entering the housing by way of said dirty gas inlet, whereby gas will be filtered through the outer periphery of said tube into the interior thereof.

2. A system in accordance with claim 1 wherein said filter tube and housing are vertically disposed, and said means closing the other end of said tube being a part of the means for supporting said tube within said housing.

3. A system in accordance witgh claim 1 including a means for applying pressure in an axial direction on said tube against an end face thereof by way of said means closing said tube in order to support said tube within said housing.

4. A system in accordance with claim 1 wherein said tube is coaxial with said inlet and said outlet of said housing.

5. A system in accordance with claim 1 wherein said tube is made from a material capable of withstanding temperatures up to about 1200° F.

6. A system in accordance with claim 1 including a source of pressurized gas communicating with the outlet of said pressure vessel.

7. A system in accordance with claim 1 wherien only one filter tube is disposed within said housing.

8. A system in accordance with claim 7 wherein said one filter tube is comprised of a rigid, porous refractory material having an axial length of approximately 18 inches, an outer diameter of approximately 8 inches and an inner diameter of approximately 6 inches.

9. A system in accordance with claim 1 including a means for supplying pressurized gas to said first valve means, whereby said pressurized gas backwashes said filter tube and pushes material downwardly within said pressure vessel.

10. A system in accordance with claim 9 including a source of pressurized gas communicating with the outlet of said pressure vessel, the pressure of the gas from said means supplying gas to said first valve means being greater than the pressure of the gas communicating with the outlet of said pressure vessel.

11. A system in accordance with claim 1 wherein the size of said housing is substantially less than the size of said pressure vessel.

* * * * *